(12) United States Patent
York

(10) Patent No.: US 7,583,005 B2
(45) Date of Patent: Sep. 1, 2009

(54) ELECTRIC MACHINE ROTOR POLE PIECE WITH ANTI COIL ROTATION

(75) Inventor: Michael T. York, Pendleton, IN (US)

(73) Assignee: Remy International, Inc., Anderson, IN (US)

( * ) Notice: Subject to any disclaimer, the term of this patent is extended or adjusted under 35 U.S.C. 154(b) by 412 days.

(21) Appl. No.: 11/437,177

(22) Filed: May 19, 2006

(65) Prior Publication Data

US 2007/0267936 A1 Nov. 22, 2007

(51) Int. Cl.
*H02K 1/22* (2006.01)
(52) U.S. Cl. .................... 310/263; 310/261
(58) Field of Classification Search ........... 310/261, 310/263, 179, 180
See application file for complete search history.

(56) References Cited

U.S. PATENT DOCUMENTS

| | | | | |
|---|---|---|---|---|
| 3,671,906 | A * | 6/1972 | Hodges et al. | 336/208 |
| 4,307,314 | A * | 12/1981 | Yamada et al. | 310/263 |
| 4,614,889 | A | 9/1986 | Ikegami et al. | 310/263 |
| 5,361,011 | A * | 11/1994 | York | 310/194 |
| 5,900,688 | A * | 5/1999 | Kreuzer et al. | 310/194 |
| 6,107,719 | A * | 8/2000 | Asao | 310/261 |
| 6,252,330 | B1 * | 6/2001 | Asao et al. | 310/263 |
| 6,307,297 | B1 * | 10/2001 | Bramson et al. | 310/263 |
| 6,369,486 | B1 * | 4/2002 | Armiroli et al. | 310/263 |
| 6,621,190 | B1 | 9/2003 | Asao et al. | 310/263 |
| 6,707,227 | B1 | 3/2004 | York et al. | 310/263 |
| 6,747,384 | B2 * | 6/2004 | Militello et al. | 310/156.08 |
| 6,888,271 | B2 | 5/2005 | York | 310/49 A |

FOREIGN PATENT DOCUMENTS

| | | |
|---|---|---|
| GB | 2032707 A | 5/1980 |
| GB | 2398431 A | 8/2004 |

OTHER PUBLICATIONS

PCT International Search Report; International Application No. PCT/US2007/009129; Date Mailed Oct. 16, 2007; International Filing Date Apr. 11, 2007.
PCT International Search Report with Written Opinion; International Application No. PCT/US2007/009129; Date Mailed Feb. 13, 2008; International Filing Date Apr. 11, 2007.

* cited by examiner

*Primary Examiner*—Thanh Lam
(74) *Attorney, Agent, or Firm*—Cantor Colburn LLP

(57) ABSTRACT

The apparatus disclosed herein relates to a pole piece for an electric machine comprising, a pole piece with a finger support structure, a plurality of fingers having an axial component of extension relative to the finger support structure, a coil contact surface and at least one of a protrusion or a depression having an axial component of extension relative to the coil contact surface. Further disclosed is a method that relates to assembling a coil to pole pieces comprising, axially compressing a coil between coil contact surfaces of a pair of opposing pole pieces and deforming the coil axially and without radial deformation with at least one of protrusions and depressions in the coil contact surfaces of the pole pieces thereby rotationally fixing the coil to the pole pieces.

16 Claims, 4 Drawing Sheets

ELECTRIC MACHINE ROTOR POLE PIECE WITH ANTI COIL ROTATION

BACKGROUND OF THE INVENTION

Currently, the majority of all vehicles driven today use front-end accessory drive electric machines also referred to herein as alternators or starter alternators. These electric machines are typically driven by belt and contain Lundell style rotors, also known as "claw pole" rotors. The rotor provides the electric machine with a magnetic field and rotates within the machine. The rotor includes a coil assembly having a field coil made up of an insulated copper wire or wires wrapped around an electrically insulating bobbin. The bobbin surrounds a steel core, and insulates the field coil from the steel pole pieces which sandwich the field coil to form north and south poles. The magnetic field is generated when the field coil is energized and a current flows through the wires.

One problem with conventional rotors is preventing rotational movement of the field coil within the rotor assembly. The rotor is driven via a belt by the engine of the vehicle. The engine is constantly changing speeds during operation leading to accelerations and decelerations of the rotor speed. Typical vehicles experience acceleration and deceleration rates of approximately 15,000 RPM/sec with transit excursions as high as 30,000 RPM/sec. Movement of the field coil wires leads to a variety of coil failures including wire fatigue fractures, insulation abrasion, and bobbin insulator wear.

Therefore, it is important in the rotor design to prevent the field coil from moving within the rotor assembly. Conventional solutions to this problem include locking features formed into the coil assembly and the pole pieces, as well as the use of epoxy fillers or other adhesives to attach the coil assembly to the pole pieces. For example, projections may be formed into the outside face of the bobbin that mate with indented features in the poles to help lock the bobbin and hence coil assembly in place.

Unfortunately, these locking features remove steel from the pole pieces, leading to higher magnetic saturation in the poles and reducing power density. In addition, the thick locking protrusions created on the bobbin are made of plastic bobbin material that is a poor conductor of heat, preventing good heat transfer from the coil to the cooler poles and leading to an increase in field coil temperature. Likewise, the use of epoxy filler takes up space that could otherwise be filled by the field coil and prevents good heat transfer, both of which decrease the power density of the alternator. In sum, current methods of locking the field coil in position create unwanted performance tradeoffs.

More recent advancements rely on interference between the pole pieces and the coil windings themselves to prevent rotation of the coils. U.S. Pat. No. 6,707,227 discloses such a structure, specifically, the coil interference with axially extending portions of the fingers of the pole pieces. The inner diameter formed by the axial extensions of the pole fingers contact the outer diameter of the coil assembly resulting in deformation of the coils into a zigzag shape as viewed axially and radially. Drawbacks of this design include the requirement for the coil assembly diameter to be matched closely with the inner diameter of the pole fingers, which means that many applications would have either, more wire in the coil than they need, or would require customized pole pieces to accommodate the diameters of smaller coils. Both conditions incur cost penalties, the first for the excess wire and the second for the custom tooling and lower volumes for the customized pole pieces. Additionally, in the condition with the excessive coils the extra wire in the coil adds inertia to the rotor slowing its acceleration and deceleration response times.

Accordingly, there exists a need to provide alternator rotor pole pieces that prevent field coil movement, within the rotor assembly, while allowing for increased heat dissipation and improved cost efficiency of the alternator.

BRIEF DESCRIPTION OF THE INVENTION

The apparatus disclosed herein relates to a pole piece for an electric machine comprising, a pole piece with a finger support structure, a plurality of fingers having an axial component of extension relative to the finger support structure, a coil contact surface of the finger support structure radially inward of the plurality of fingers, and at least one of a protrusion or a depression having an axial component of extension relative to the coil contact surface.

Further disclosed is a method that relates to assembling a coil to pole pieces comprising, axially compressing a coil between coil contact surfaces of finger support structures of a pair of opposing pole pieces and deforming the coil axially and without radial deformation with at least one of protrusions and depressions in the coil contact surfaces of the pole pieces thereby rotationally fixing the coil to the pole pieces.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
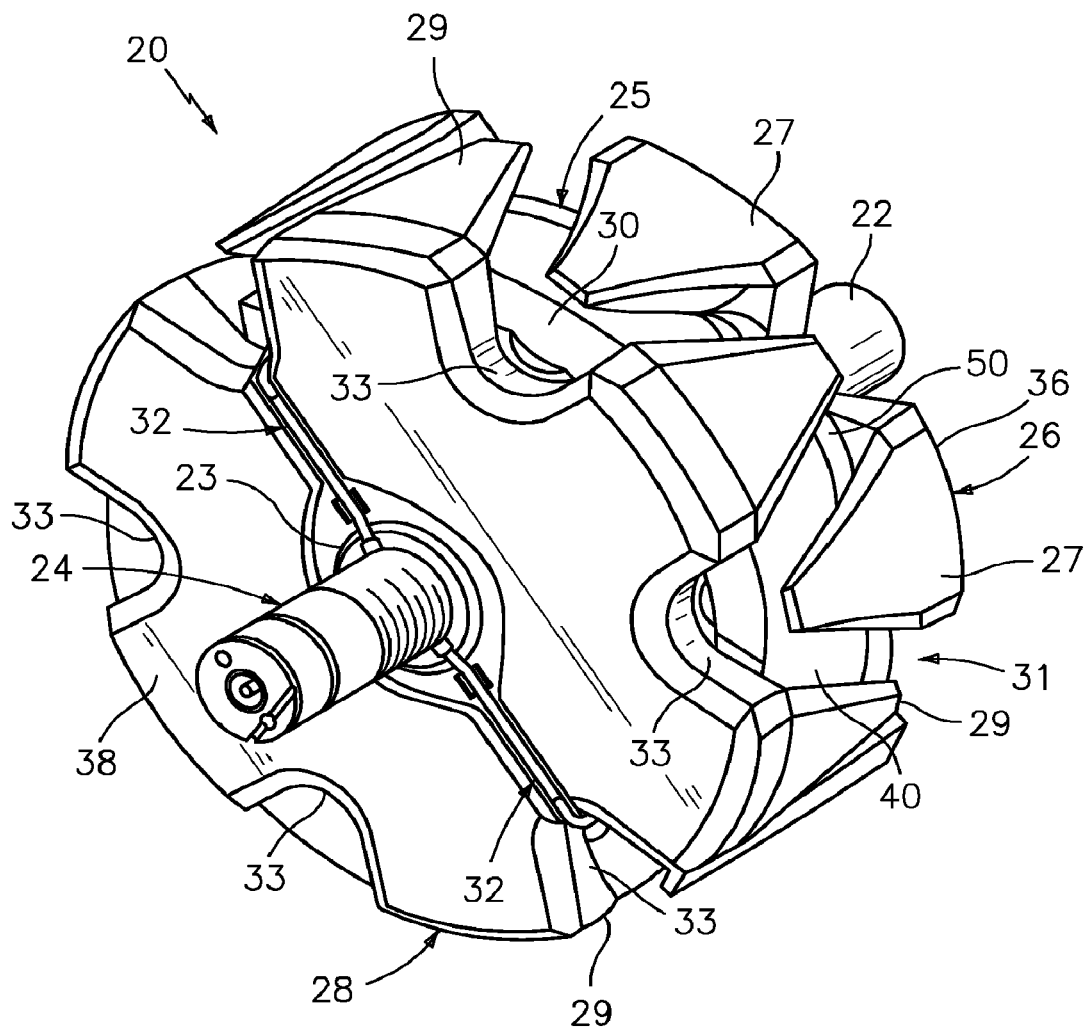
FIG. 1 depicts a perspective view of a rotor disclosed herein.
Figure 2:
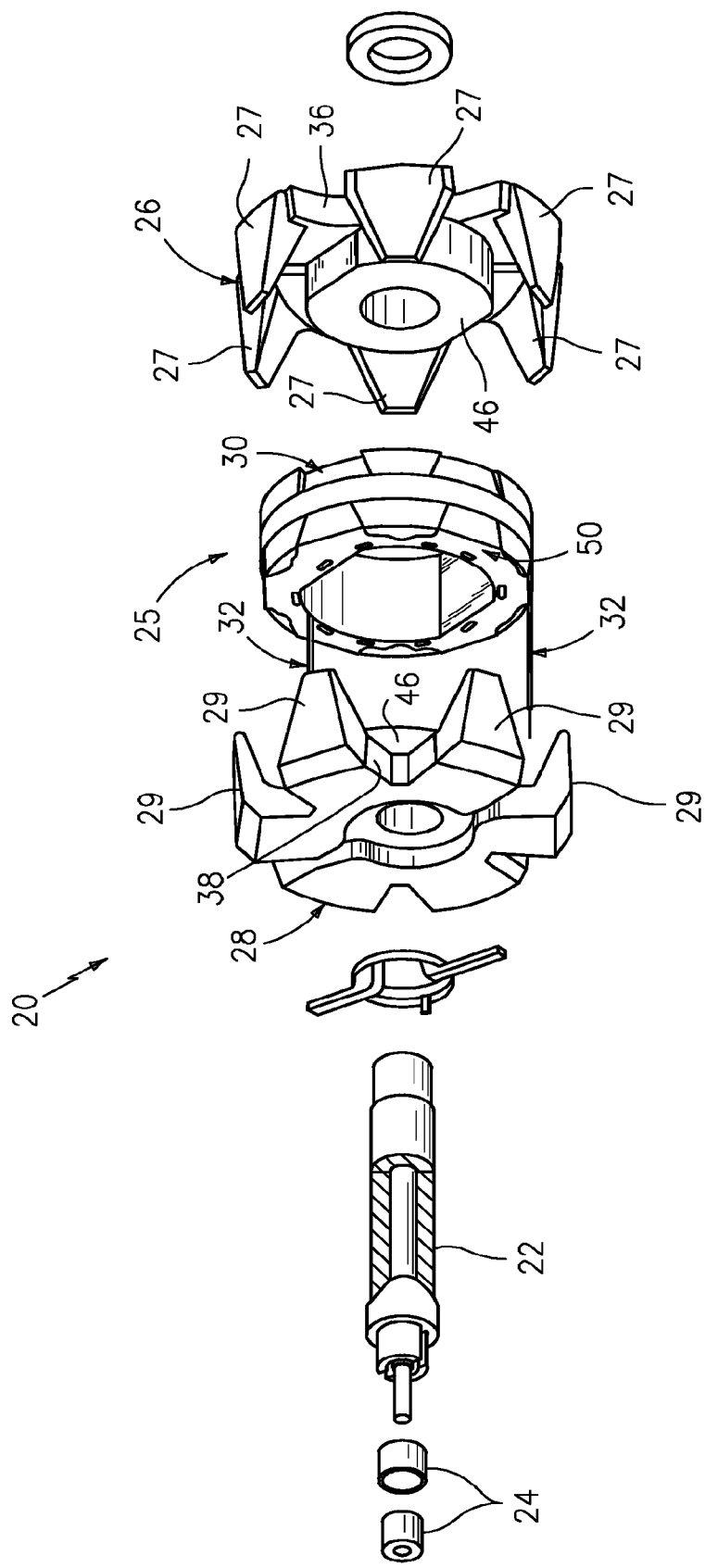
FIG. 2 depicts an exploded view of the rotor of FIG. 1.

Referring to FIGS. 1 and 2, a rotor assembly or rotor 20 according to embodiments of the invention is depicted. Generally, the rotor 20 includes a shaft 22 defining a central axis passing through the center of the rotor 20 and including a slip ring assembly 24 for providing power to the rotor 20. The rotor 20 further includes a first or front pole piece 26 and a second or rear pole piece 28. These opposing pole pieces 26, 28 each include a finger support structure 36, 38 that have a plurality of pole fingers 27, 29 extending therefrom, respectively. The fingers 27, 29 are equidistantly spaced about the periphery of the finger support structures 36, 38. The opposing finger support structures 36, 38 also include a plurality of recesses 31, 33, respectively, which are defined by the spaces, positioned substantially midway between adjacent fingers 27, 29. The shaft 22 is inserted through the center of the pole pieces 26, 28, and the shaft 22 is connected to the pole pieces 26, 28 by means of a press fit between the shaft 22 and the pole pieces 26, 28, although other connection mechanisms may be used as is known in the art. For example, poles 26, 28 may be connected to the shaft 22 by staking the pole material into grooves on the shaft (not shown).

Figure 3:
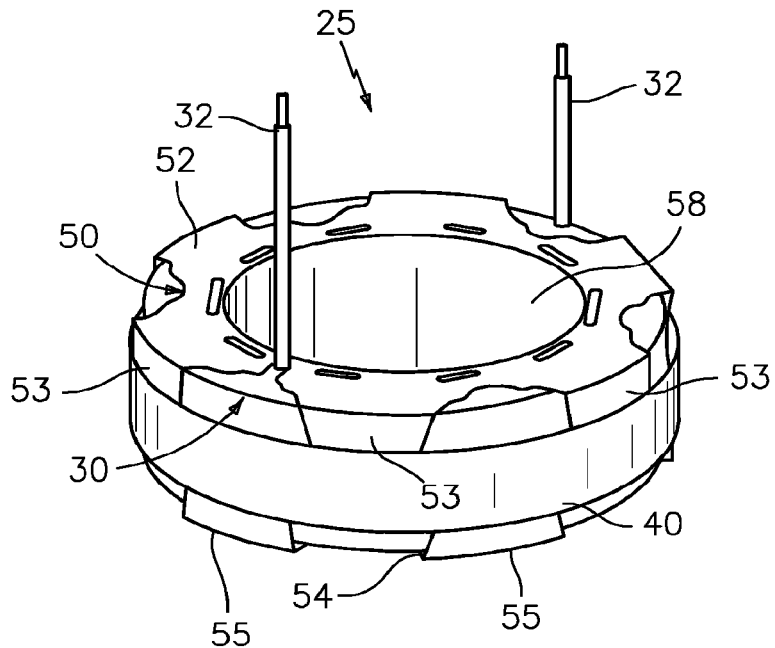
FIG. 3 depicts a coil assembly from the rotor of FIGS. 1 and 2.

The poles 26, 28 are used to encase a coil assembly 25 therebetween. Referring to FIG. 3, the coil assembly 25 generally includes a field coil 30 wound onto an insulating bobbin 50. The field coil 30 includes two leads 32 which extend in a slot along the outer surface of the rear pole 28 for internal connection to the slip ring assembly 24. When the field coil 30 is powered via the slip ring assembly 24 and leads 32, a magnetic field is generated which flows through the pole pieces 26, 28, while the entire rotor assembly 20 is rotated via the shaft 22 within the alternator.

The bobbin 50 is utilized to electrically insulate the field coil 30 from the pole pieces 26, 28. A single piece or a multiple piece bobbin construction may be employed. The bobbin 50 includes a first end cap 52 and a second end cap 54 attached to opposing ends of a cylinder 58. Each end cap 52, 54 includes a plurality of flaps 53, 55, which project radially outward and are equidistantly spaced about the end caps 52, 54. The flaps 53, 55 are folded over the outer surface of the field coil 30, and a layer of electrically insulating tape 40 is applied thereover.

The coil assembly 25 is pressed onto an optional integrated core 46 of one pole (FIG. 2), such as pole 26. The opposing pole 28 and its optional integrated core 46 is then pressed into the opposing end of the coil assembly 25 such that the faces of each pole core 46 come in contact with each other. The shaft 22 is press-fit through bores defined in the poles 26, 28 keeping them in contact with each other. It will be recognized that for some rotors, the core 46 may be a separate piece and not integrally formed with the pole pieces, and hence the coil assembly 25 will be attached to the core in a manner dictated by the particular rotor structure.

Figure 4:
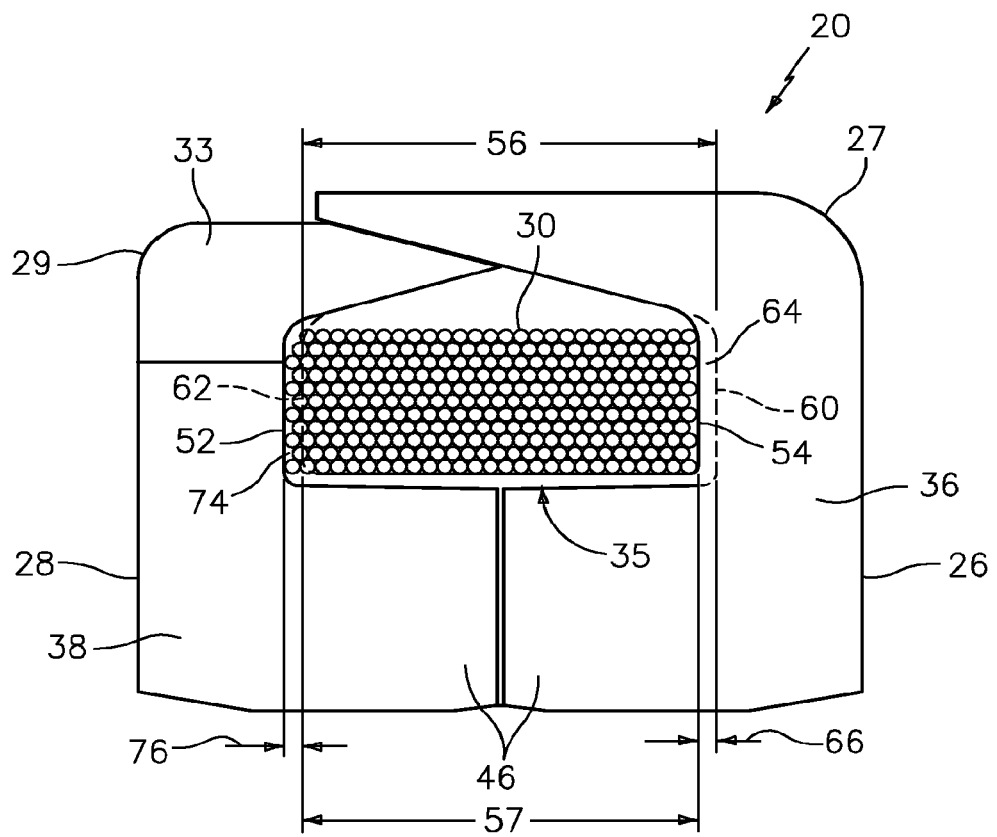
FIG. 4 depicts a partial cross sectional view of the rotor or FIGS. 1 and 2.
Figure 5:
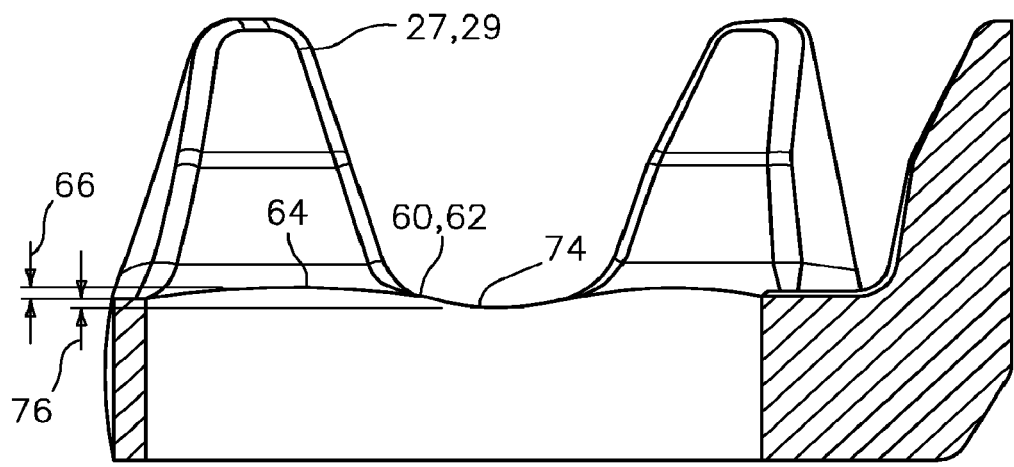
FIG. 5 depicts a partial cross sectional view of a pole piece disclosed herein.

Referring to FIG. 4, a partial cross sectional view of a rotor 20, with an embodiment of the invention, is shown. Rotor 20 is shown with pole pieces 26 and 28 abutted such that center cores 46 of both pole pieces 26, 28 are mated flush with one another. The nominal width 56 of the coil 30 is designed to be substantially equal to the nominal width 57 created by the pole pieces 26, 28. The nominal width 57 is defined by the distance between a coil contact surface 60 of finger support structure 36 of pole piece 26 and, a coil contact surface 62 of finger support structure 38 of pole piece 28. In accordance with an embodiment of the present invention protrusions 64 are formed on the coil contact surfaces 60, 62 substantially in circumferential alignment with the fingers 27 and 29, respectively. The protrusions 64 extend axially inboard from the nominal coil contact surfaces 60, 62 a distance 66. The distance 66 may be determined for each particular rotor 20 to assure that the coil 30 is adequately deformed by the protrusions 64 to rotationally fix the coil 30 to the pole pieces 26, 28. Referring to FIG. 5, the protrusions 64 are shown extending the distance 66 beyond the nominal surfaces 60, 62. The protrusions 64 may take the form of various shapes, however, care should be taken to prevent damage to the end caps 52, 54, and therefore gradual transitions between the protrusions 64 and the surfaces 60, 62 may be desirable.

Also shown in FIGS. 4 and 5, are depressions 74 that are formed into the coil contact surfaces 60, 62. The number of depressions 74 and the spacing of them relative to one another is similar to that of the protrusions 64. The depressions 74 are positioned substantially in alignment with the recesses 31 and 33, which are midway between the fingers 27 and 29 respectively. However, alternate embodiments may have the depressions 74 positioned substantially in alignment with the fingers 27, 29. The depressions 74 are formed a depth 76 into the coil contact surfaces 60, 62. The depth 76 may be determined for each particular rotor 20 to assure that the coil 30 adequately deforms into the depressions 74 to rotationally fix the coil 30 to the pole pieces 26, 28. The depressions 74 are also contoured to facilitate deformation of the coil 30 into the depressions 74 in such a manner as to maintain substantial surface contact between the coil 30 and the coil contact surfaces 60, 62 throughout the depressions 74. Referring to FIG. 5, the shape and depth 66 of the depressions 74 relative to the coil contact surfaces 60, 62 are shown, as well as the shapes and extension 76 of the protrusions 64. The depressions 74 may take the form of various shapes, however, care should be taken to prevent damage to the coil end caps 52, 54, and therefore gradual transitions from the depressions 74 to the coil contact surfaces 60, 62 may be desirable.

It should be noted that although FIGS. 4 and 5 depict an embodiment incorporating both protrusions 64 and depressions 74, alternate embodiments employing only the protrusions 64 or only the depressions 74 are still within the scope of the present invention. Additionally, for embodiments employing both protrusions 64 and depressions 74, it may be desirable to make the protrusions 64 and depressions 74 with a similar shape and distance 66, 76, to facilitate the deformation of the coil 30. Stated another way, since the protrusions 64 of one pole piece 28, 26 are in circumferential alignment with the depressions 74 of the other pole piece 26, 28, by using a similar shape and distance 66, 76 for both the protrusions 64 and the depressions 74, the coil 30 may deform around one protrusion 64 and into the depression 74 positioned directly opposite of the protrusion 64.

Figure 6:
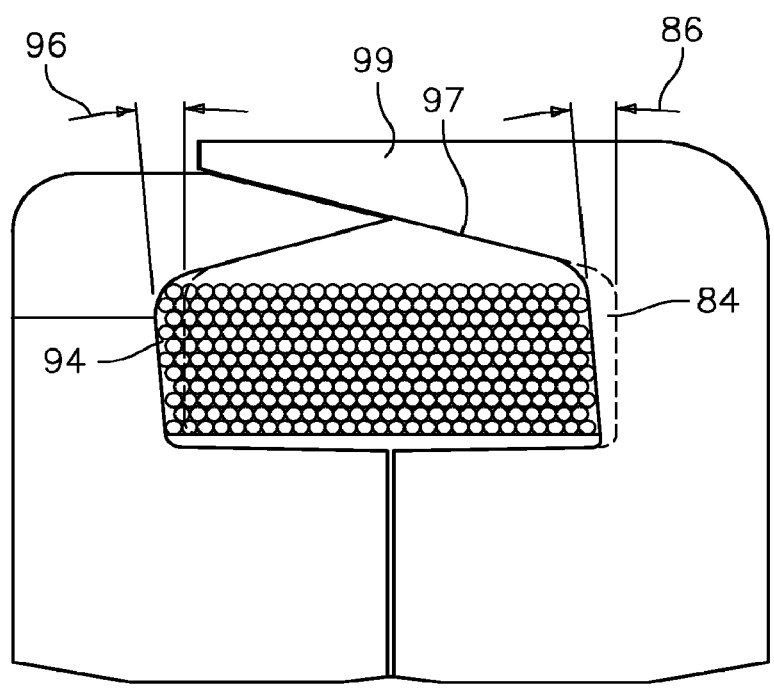
FIG. 6 depicts a partial cross sectional view of a rotor disclosed herein.

Referring to FIG. 6, an alternate embodiment of the invention shows protrusions and depressions with alternate shapes. A protrusion 84 formed on surfaces 60, 62 includes an angle 86 relative to the surfaces 60, 62. Specifically, the angle 86 results in a protrusion 84 with a variable distance from the surface 60, 62 such that the distance increases as the radius at which it is measured increases. Similarly, a depression 94 in surfaces 60, 62 is formed at an angle 96 relative to the surfaces 60, 62. The angle 96 results in a depression 94 with a variable distance from the surfaces 60, 62 such that the distance increases as the radius at which it is measured increases.

Although embodiments described herein have incorporated both protrusions 64, 84 and depressions 74, 94 simultaneously, it should be noted that incorporation of protrusions 64, 84 without the use of depressions 74, 94, and alternately, the incorporation of depressions 74, 94 without the use of protrusions 64, 84, is fully within the scoped and spirit of embodiments of the present invention.

It should be noted that embodiments of the invention allow for the use of coil assemblies 25 of various sizes with a single set of pole pieces 26, 28 since rotationally fixing the coil assembly 25 to the pole pieces 26, 28 does not rely on contact with an inner surface 97 of an axially extending finger portion 99. Use of a single set of pole pieces 26, 28 with various coil assemblies 25 allows for cost savings since customized tooling and pole pieces 26, 28 are not required as would be if the coil assembly 25 was to be compressed by the inner surface 97 of the axially extending finger portion 99. Additionally, the material added to the pole pieces 26, 28 by the addition of the protrusions 64, 84 increases the strength of the fingers 27, 29 resulting in less finger deflection due to centrifugal force at high rotor speeds, and better heat transfer, due to the increased contact area between the poles 26, 28 and the coil 30, as well as more magnetic flux carrying capacity of the pole pieces 26, 28.

Some embodiments of the invention may have some of the following advantages: coil assemblies that are rotationally fixed to the pole pieces, fewer durability failures due to movement of the coil within the rotor assembly, less magnetic flux saturation of the pole pieces, improved heat transfer through the pole pieces, increased interchangeability of pole pieces between various rotor assemblies, and less finger deflection during high rotor speeds.

While the embodiments of the disclosed apparatus and method have been described with reference to exemplary embodiments, it will be understood by those skilled in the art that various changes may be made and equivalents may be substituted for elements thereof without departing from the scope of the embodiments of the disclosed apparatus and method. In addition, many modifications may be made to adapt a particular situation or material to the teachings of the embodiments of the disclosed apparatus and method without departing from the essential scope thereof. Therefore, it is intended that the embodiments of the disclosed apparatus and method not be limited to the particular embodiments disclosed as the best mode contemplated for carrying out the embodiments of the disclosed apparatus and method, but that the embodiments of the disclosed apparatus and method will include all embodiments falling within the scope of the appended claims.

What is claimed is:

1. A pole piece for an electric machine, comprising:
a pole piece with a finger support structure;
a plurality of fingers having an axial component of extension relative to the finger support structure;
a coil contact surface of the finger support structure radially inward of the plurality of fingers; and
at least one protrusion having an axial component of extension relative to the coil contact surface.

2. The pole piece of claim 1, wherein:
the at least one protrusion is substantially in alignment with a finger.

3. The pole piece of claim 1, wherein:
the at least one protrusion is oriented as a radial spoke.

4. The pole piece of claim 3, wherein:
the at least one protrusion extends further from the coil contact surface at greater radial locations.

5. The pole piece of claim 1, wherein:
the electric machine is an alternator.

6. The pole piece of claim 1, wherein:
the at least one protrusion forms a gradual transition with the coil contact surface.

7. A pole piece for an electric machine, comprising:
a pole piece with a finger support structure;
a plurality of fingers having an axial component of extension relative to the finger support structure;
a coil contact surface of the finger support structure radially inward of the plurality of fingers; and
at least one depression having an axial component of extension relative to the coil contact surface and the depression being contoured to maintain substantial contact with the surface of a coil to be employed therewith.

8. The pole piece of claim 7, wherein:
the at least one depression is substantially in alignment with a recess substantially midway between adjacent fingers.

9. The pole piece of claim 7, wherein:
the at least one depression is oriented as a radial spoke.

10. The pole piece of claim 9, wherein:
the at least one depression extends further from the coil contact surface at greater radial locations.

11. The pole piece of claim 7, wherein:
the at least one depression is substantially in alignment with a finger.

12. The pole piece of claim 7, further comprising:
at least one protrusion having an axial component of extension relative to the coil contact surface.

13. The pole piece of claim 12, wherein:
the at least one depression is substantially in alignment with a recess substantially midway between adjacent fingers; and
the at least one protrusion is substantially in alignment with a finger.

14. The pole piece of claim 12, wherein:
the at least one depression and the at least one protrusion are oriented as radial spokes.

15. The pole piece of claim 14, wherein:
the at least one depression extends further from the coil contact surface at greater radial locations; and
the at least one protrusion extends further from the coil contact surface at greater radial locations.

16. The pole piece of claim 12, wherein:
the at least one protrusion forms a gradual transition with the coil contact surface.

* * * * *